March 24, 1953
C. W. GRAY
2,632,667
SUPERSTRUCTURE AND BUNK FRAME ARRANGEMENT FOR CAMP TRAILERS
Filed Oct. 23, 1947
3 Sheets-Sheet 2
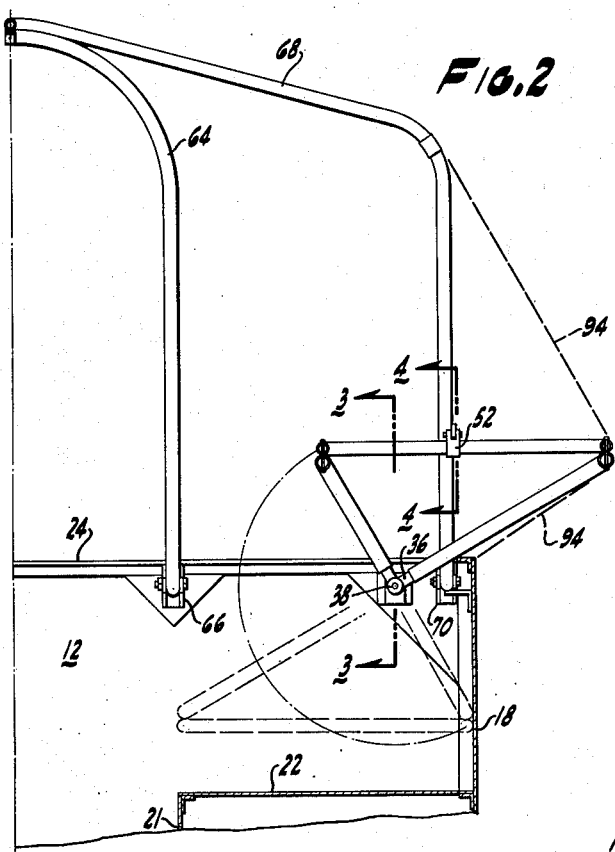
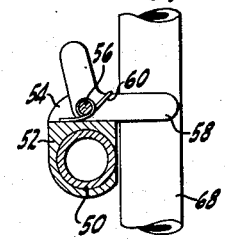
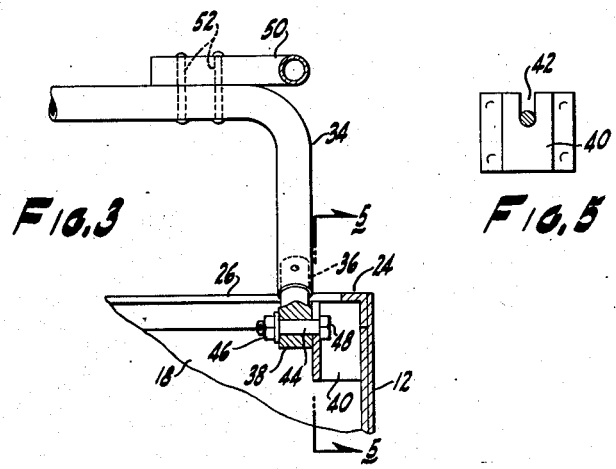
INVENTOR
Charles W. Gray
BY
*Naylor and Lassagne*
ATTORNEYS

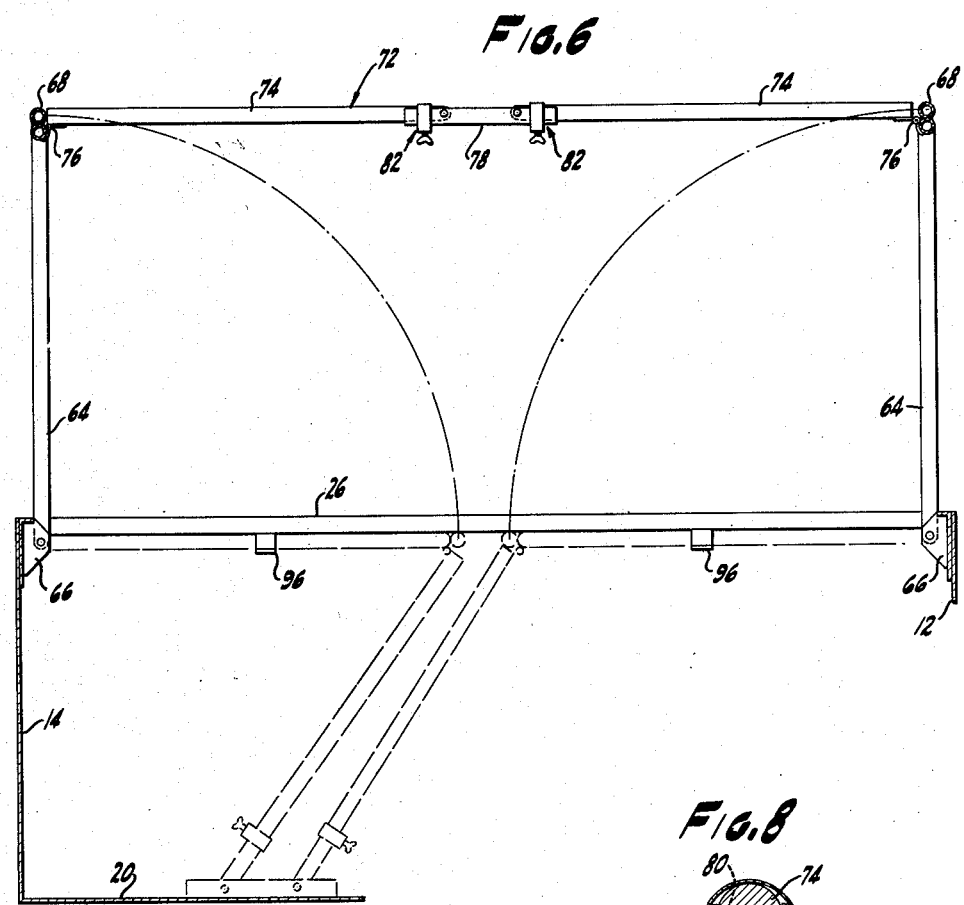
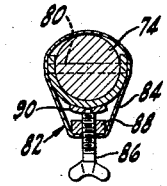
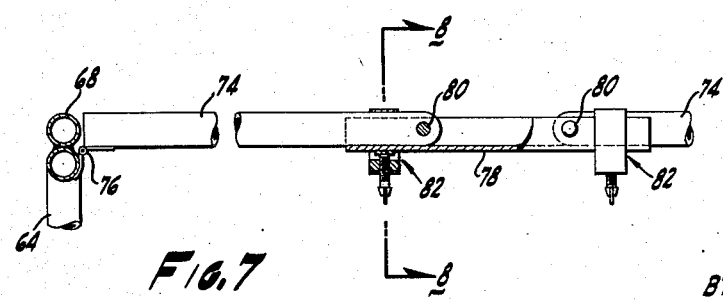

Patented Mar. 24, 1953

2,632,667

UNITED STATES PATENT OFFICE 2,632,667

SUPERSTRUCTURE AND BUNK FRAME ARRANGEMENT FOR CAMP TRAILERS

Charles W. Gray, Alameda, Calif., assignor to Trail Equipment Company, a corporation of California Application October 23, 1947, Serial No. 781,546

3 Claims. (Cl. 296—23)

This invention relates to camp trailers, and more particularly to a foldable superstructure and pivotable bunk frame arrangement for camp trailers.

An object of the invention is to provide a camp trailer having a foldable superstructure, or tent housing frame, and pivotable bunk frames adapted in their operative position to serve as lateral supports for the superstructure.

Another object of the invention is to provide a camp trailer having a foldable superstructure and pivotable bunk frames in novel cooperative relation therewith, said superstructure being adapted to support a tent housing and to prevent the accidental pivoting of the bunk frames to their inoperative position and said bunk frames in their operative position being adapted to serve as lateral supports for the foldable superstructure and to exert a lateral thrust on the tent housing to maintain the latter taut.

A further object of the invention is to provide a camp trailer having bunk frames adapted in one position of operation to be within the walls of the trailer, and pivotally supported in such manner as to be rotatable to an over-center position of operation in supporting engagement with the trailer walls, and further adapted to be maintained in said over-center position by the weight of the occupants.

These and other objects and advantages of the invention will be apparent from the following description taken in conjunction with the drawings forming part of this specification, and in which:

Figure 2 is a partial view in end elevation of the trailer, showing the bunk frame and superstructure arrangement thereof;

Figure 3 is a view taken along section lines 3—3 of Figure 2;

Figure 4 is a detail view taken along section lines 4—4 of Figure 2;

Figure 5 is a detail view taken along section lines 5—5 of Figure 3;

Figure 6 is a view in side elevation of the superstructure of the trailer, showing in dotted outline the superstructure in its folded position;

Figure 7 is an enlarged view of the ridge-pole structure embodied in the superstructure; and Figure 8 is a view in section taken along lines 8—8 of Figure 7.

Figure 1:
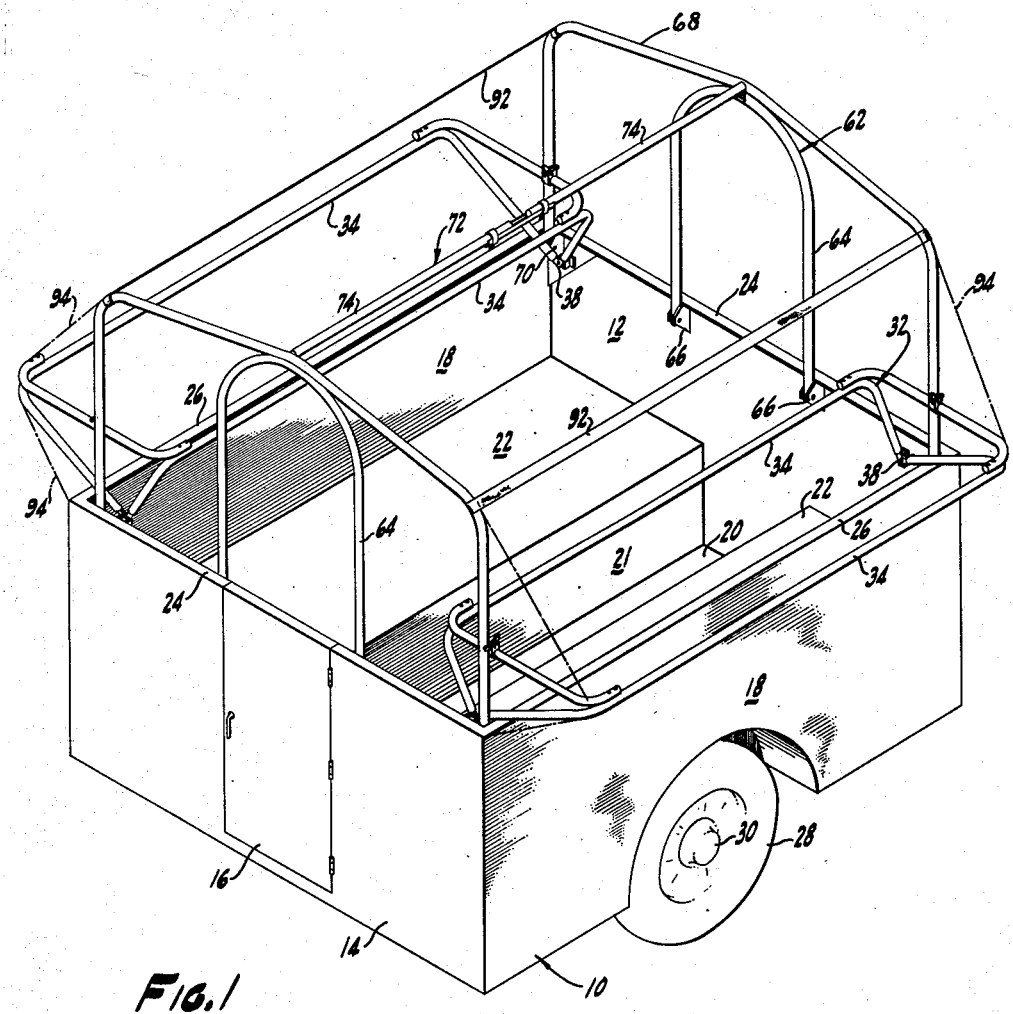
Figure 1 is a view in perspective of a camp trailer embodying the invention.

Referring to the drawings for details of the invention, the trailer of Figure 1 is comprised of a body 10 rectangular in plan form and having a front wall 12, a rear wall 14 provided with a door 16, side walls 18, a floor 20, and skirts 21 extending upwardly from the floor 20 and supporting, in conjunction with the front, rear and side walls, platforms 22, which may be used as secondary bunk frames. The body 10 is preferably constructed with angle-iron or L-beam members, forming the skeletal outline of the body, and sheet aluminum or plywood walls are supported between said L-beams. As will be seen in Figure 1, L-beams form the upper edges 24 and 26, respectively, of the front and rear walls 12 and 14 and the side walls 18 of the body. The body is supported on a pair of wheels 28 mounted on an axle 30 connected to the underside of the body, and a conventional stake tongue, not shown, extends forwardly of the trailer to provide for the tripodal support and anchoring thereof.

With the aforedescribed structure as foundational environment, the invention is concerned with the pivotal bunk frame structure and cooperative folding superstructure carried thereby. The pivotal bunk frames, indicated generally by 32, are each comprised of a pair of angularly disposed elongated U-shaped members 34, tubular in form, having their ends sleeved and pinioned on arms 36 of ell members 38, said ell members being removably mounted on brackets 40, having slots 42 communicating with the upper edge thereof, by bolts 44 and nuts 46. The bolts are cradled in the slots 42 of the brackets 40 and are provided with heads 48 of greater size than the width of the slots. It will be seen that the bunk frames 32 may be lifted free of engagement with the brackets 40, for repair and the like, and may be re-engaged with said brackets with facility.

The members 34 of the bunk frames are interconnected by U-shaped reinforcement members 50, also tubular in form, which serve as ends for the bunk frames, said members 50 being secured to the members 34 by bolts 52. Sleeves 52 secured on the members 50 are provided with ears 54 serving as journal supports for shafts 56 carrying levers 58. Springs 60 carried by the shafts 56 in engagement with the sleeves 52 and levers 58, as shown in Figure 4, serve to maintain said levers in the position of Figure 4, for a purpose hereinafter described.

The trailer is provided with a foldable superstructure, indicated generally at 62, comprising U-shaped arches 64 having their lower ends pivotally connected to brackets 66 carried by both the front and rear walls 12 and 14, and having their upper ends secured, as by welding, to the mid-portions of large arches 68, said arches 68 being substantially U-shaped in form and having the lower ends thereof pivotally secured to brackets 70 carried by the front and rear walls of the trailer. The arches 64 are interconnected by a ridge pole 72 comprising end sections 74 pivotally secured, as by strap hinges 76 to said arches. The inner ends of the sections 74 lie within a channel member 78 and are pivotally secured thereto by pins 80. Clamps 82, comprising flexible loops 84, wing bolts 86 threadably engaged with blocks 88 carried by the loops, and abutment members 90 freely attached to the ends of bolts 86, serve to secure the end sections 74 and channel member 78 of the ridge pole in alignment in the position of Figures 1 and 6.

The arches 68 of the superstructure are interconnected by straps 92, which, in conjunction with the ridge pole, serve as a support for a tent housing 94, secured to the superstructure and shown in shadow outline in Figures 1 and 2. The lower margins of the tent housing are battened to the upper portions of the outside surfaces of the front and rear walls 12 and 14 and side walls 18, as by snap fasteners, not shown.

When the superstructure and bunk frames are in the operative position of Figures 1 and 2, the following cooperative relationship between the trailer elements is to be pointed out: The bunk frames 32 impart a lateral thrust to the tent housing, thereby maintaining the tent housing taut, and the inwardly and downwardly inclined outer members 34 of the bunk frames allow for a ready securing of the tent housing to the side walls 18; the bunk frames are supported by the upper edges of the side wall 18, and they are so arranged with respect to their pivot point that the weight of an occupant normally tends to maintain them in engagement with the edges of the side walls; the bunk frames, in turn, serve as lateral supports for the superstructure 62; and the superstructure prevents the possibility of an inward pivoting of the bunk frames, since the arches 68 abut the locking levers 58 carried by the bunk frames.

To render the camp trailer more compact, as for travel, the spring urged levers 58 are pivoted out of the path of the arches 68 and the bunk frames are rotated inwardly to the dotted line position of Figure 2, where the weight of the frames in relation to the offset pivot points thereof serves to maintain them in abutting relation with the inner surfaces of the side walls 18, and completely beneath the upper edges of the trailer walls. The wing bolts 86 of the clamps 82 are then loosened so that the clamps may be slid off of the channel member 78, whereupon the superstructure may be folded to the dotted line position of Figure 6, with the channel member 78 of the ridge pole in engagement with the floor 20 and with the arches 68 of the superstructure supported in cradles 96 carried at the inside of side walls 18. The tent housing 94 is enfolded between the elements of the superstructure by the folding of the latter without the necessity of unfastening the tent housing from the trailer walls, since the inward pivoting of the bunk frames leaves sufficient slack in the tent housing to accomplish this purpose.

To again prepare the trailer for occupancy: The superstructure elements are pivoted to a vertical position; the clamps 82 are moved onto the channel member 78 and secured to lock the ridge pole in position; the bunk frames 32 are pivoted toward the solid line position of Figure 2 to take up the slack of the tent housing and to laterally stress said housing; the levers 58 are pivoted to the unlocking position, following which the bunk frames are pivoted to abut the upper edges of the side walls 18; and the levers 58 are released to snap into the locking position of Figure 4. It will be noted that the superstructure elements 62, when moved into their upright position, abut the upper edges 24 of the front and rear trailer walls, since the hinge points of these elements are below said wall edges, and this contact of the elements 62 with the edges 24 prevents further outward movement of the superstructure and provides for a free vertical support thereof while the bunk frames are pivoted to their overcenter positions.

It is to be pointed out that a subassembly comprised of the foldable superstructure, the bunk frames, and abbreviated support members therefor may be separately manufactured as a unit for installation on any box trailer.

It will be seen from the foregoing description of the invention that I have provided a camp trailer embodying a foldable superstructure and pivotable bunk frames having a simple and novel cooperative relation therewith, and it will be understood that I do not intend that the structure of the invention be limited to the precise details shown, but, rather, that it be subject to modification within the spirit of the invention and the scope of the appended claims.

I claim:

1. A camp trailer comprising pairs of opposed walls, an arch-type frame secured to each of a pair of opposed walls and pivotable about a horizontal axis, said frames being foldable toward each other and into the space defined by said walls in one position of operation and being pivotable to extend upwardly for the support of a tent housing in another position of operation, a pair of oppositely disposed bunk frames secured between a pair of opposed walls in adjacent and parallel relation to the other pair of walls, said bunk frames being pivotable about horizontal axes, located normal to the axes of pivot of said arch-type frames, toward each other and into the space defined by said walls in a first position of operation and being pivotable away from each other into a second position of operation wherein each bunk frame extends between said arch-type frames and is adapted to support both of the latter frames in their upwardly extending position, and locking means carried by the bunk frames operable to prevent an accidental return of the bunk frames to their first position of operation.

2. In a camp trailer having opposed pairs of walls, a unitary bunk frame pivotally supported between a pair of said walls in adjacent and parallel relation to a wall interconnecting said pair, the axis of pivot of said frame being located below the upper edge of said interconnecting wall and in spaced relation to said wall, said frame comprising a horizontally disposed upper frame portion defining an area for occupancy and a lower frame portion rigidly secured to said upper frame portion comprising a frame member extending from said axis of pivot upwardly and outwardly therefrom into engagement with the upper edge of said interconnecting wall, said frame being in position for occupancy when in said wall-edge supported position and having its center of gravity located outwardly of said axis of pivot, said frame being pivotable out of engagement with said wall edge into an inverted position within the space defined by the opposed pairs of walls.

3. In a camp trailer having opposed pairs of walls, a bunk frame pivotally supported between a pair of said walls in adjacent and parallel relation to a wall interconnecting said pair, the axis of pivot of said frame being located below the upper edge of said interconnecting wall and in spaced relation to said wall, said frame comprising a horizontally disposed upper frame portion defining an area for occupancy and a lower or supporting frame portion rigidly secured to the sides of the upper frame portion and comprising a first frame member extending from said axis of pivot upwardly and outwardly therefrom into engagement with the upper edge of said interconnecting wall, and a second frame member extending from said axis of pivot upwardly and inwardly therefrom, said first frame member being of sufficiently greater length than said second member to locate the center of gravity of said frame outwardly of said axis of pivot, said frame being pivotable out of engagement with said wall edge into an inverted position within the space defined by the opposed pairs of walls.

CHARLES W. GRAY.

REFERENCES CITED

The following references are of record in the file of this patent:

UNITED STATES PATENTS

| Number | Name | Date |
| --- | --- | --- |
| 1,247,282 | Kline | Nov. 20, 1917 |
| 1,378,512 | Bain | May 17, 1921 |
| 1,564,257 | Lippman | Dec. 8, 1925 |

FOREIGN PATENTS

| Number | Country | Date |
| --- | --- | --- |
| 407,247 | Great Britain | Mar. 15, 1934 |